Oct. 26, 1937.   W. B. FAGEOL   2,097,391
VEHICLE DRIVE AND CONTROL MECHANISM
Filed Dec. 16, 1931   3 Sheets-Sheet 2

Inventor
William B. Fageol
Stauch & Hoffman
Attorneys

Oct. 26, 1937.  W. B. FAGEOL  2,097,391
VEHICLE DRIVE AND CONTROL MECHANISM
Filed Dec. 16, 1931   3 Sheets-Sheet 3
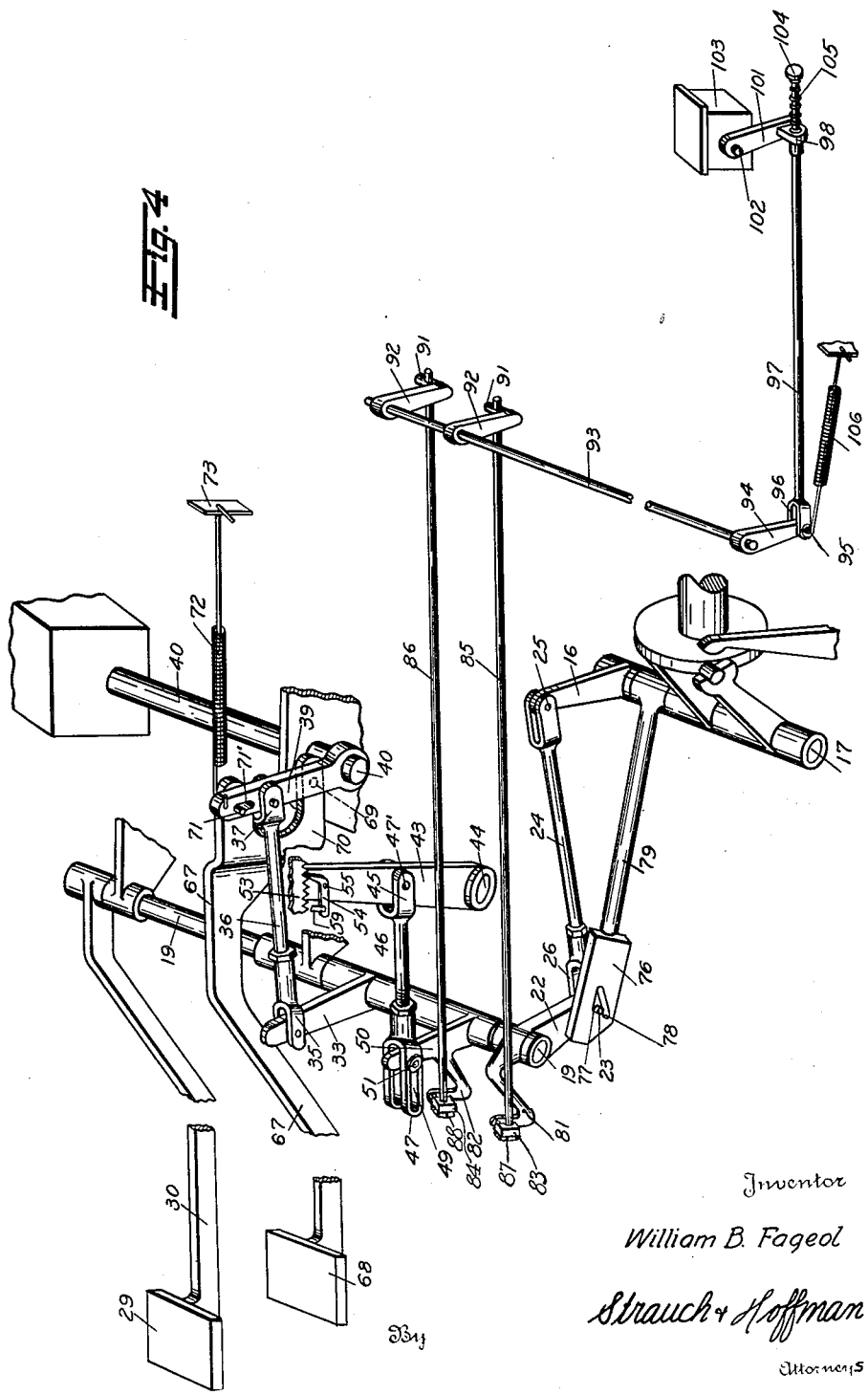
Inventor
William B. Fageol
Strauch & Hoffman
Attorneys Patented Oct. 26, 1937

2,097,391

UNITED STATES PATENT OFFICE 2,097,391

VEHICLE DRIVE AND CONTROL MECHANISM

William B. Fageol, Kent, Ohio, assignor, by mesne assignments, to Divco-Twin Truck Company, Detroit, Mich., a corporation of Michigan Application December 16, 1931, Serial No. 581,433

20 Claims. (Cl. 192—.01)

This invention relates to an arrangement for controlling the operation of a motor vehicle, such as a delivery vehicle. More particularly, the invention relates to a control arrangement for a vehicle of the type in which a transverse passageway is provided through the body, permitting the operator to readily alight or dismount from the vehicle in which the control elements are disposed in the passageway so as to simplify the starting and stopping of the vehicle under all conditions while the operator is standing or sitting therein. The present invention comprises an improvement in the vehicle control mechanisms disclosed in my copending application Serial Number 558,616, filed August 21, 1931.

In my Patent Number 1,777,966, granted October 7, 1930, I have disclosed a delivery vehicle including a passageway extending transversely through the body, which passageway is provided with a low floor line enabling the operator of the vehicle to readily mount the vehicle in making the deliveries for which purpose the vehicle was particularly designed. In the operation of vehicles of this character it is desirable that a control arrangement be provided that will enable the operator of the vehicle to expeditiously start, stop and govern the vehicle with a minimum of effort and maximum of safety all to the end that the vehicle is capable of most efficiently serving the purpose for which it was provided.

An object of the present invention is to provide a control arrangement for a delivery vehicle of the type just referred to, that will enable an operator of the vehicle to efficiently and expeditiously control the vehicle either in standing or seated position, and to correlate the control elements that protrude into the passageway with the seat provided for the operator in such a way as to provide a maximum clearance in the passageway when the seat is not in use.

The invention also provides an efficient arrangement whereby the clutch, preferably of the automatic type disclosed in copending application Serial Number 488,757 filed October 15, 1930, forming a part of the driving mechanism of the vehicle, and the engine throttle may be operated in proper sequence by a single foot pedal disposed in the passageway through the body of the vehicle, whereby a standing operator can control the throttle and clutch with one foot. A clutch of the automatic type suitable for use, in the driving mechanism of the vehicle for operation in conjunction with the controlling arrangement of this invention is disclosed in Patent No. 1,822,716 to H. H. Vail granted September 8, 1931.

Another object of the invention is to provide a delivery vehicle in which the brake mechanism and the engine throttle are interconnected for operation either by a single foot pedal conveniently arranged in the vehicle body, or by a hand lever located so that the vehicle may be efficiently stopped by the operator of the vehicle, irrespective of the position that he may occupy, within wide limits, in the vehicle body.

This invention also aims to provide a combination control for the clutch forming a part of the driving mechanism of the vehicle, the braking mechanism for the vehicle, and the engine throttle, in which the clutch and throttle, and the braking mechanism and throttle, may be selectively operated by foot pedals and the braking mechanism and throttle may also be operated by a hand lever, the foot pedals being operable to close and open the throttle from and to a position of maximum throttle opening predetermined by the hand lever.

Still further objects of the invention will appear as the description thereof proceeds with reference to the accompanying drawings in which:

Figure 4 is diagrammatic view of the control mechanism of Figures 1 and 2, the supporting connection to the vehicle of certain of the parts being omitted for the sake of clearly illustrating the operation of the movable parts thereof.

Like reference characters indicate like parts throughout the several figures.

Figure 1:
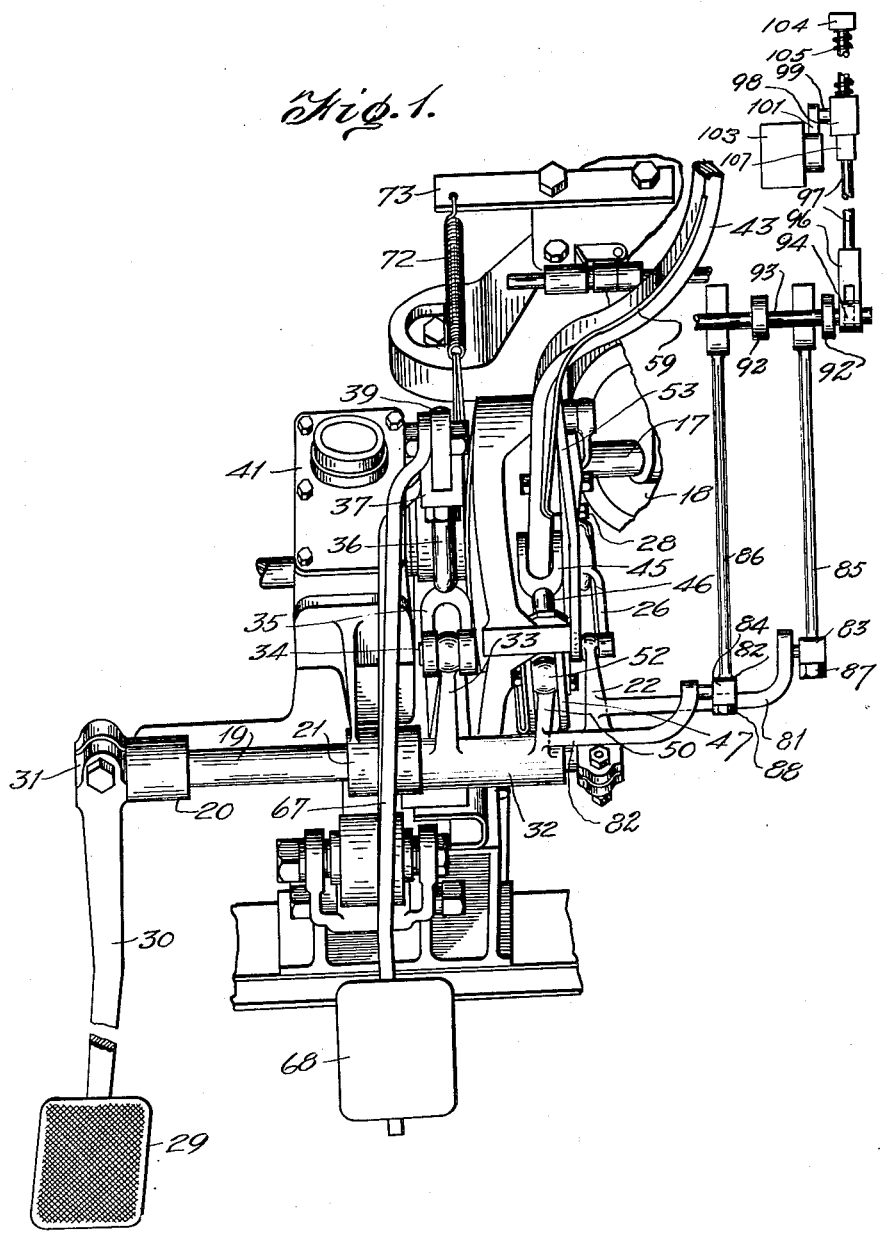
Figure 1 is a perspective view of the preferred form of vehicle control mechanism.

The present invention is intended for application particularly to vehicles such as delivery vehicles, in which it is intended that the operator control the vehicle, at least at times, when he is in a standing or leaning position requiring that his weight be supported on one or the other of his feet, thus restricting the freedom of movement of the feet in controlling the vehicle. Vehicles of this character are frequently provided with a passageway extending transversely across the body thereof, in which the operator stands or in which he sits when he is driving the vehicle from one point to another. This passageway is provided in order to furnish free ingress and egress of the operator in making deliveries, the rapidity of which is dependent in large measure upon the ease and facility with which the operator can leave and enter the vehicle and operate the necessary controls through which the vehicle is frequently stopped and started.

Referring to the drawings, the floor within the body of such a passageway is designated by the numeral 10. Such floor extends across the body at the same level, except where it is interrupted by the tunnel 11, through which the drive shaft passes from a forwardly disposed power plant, arranged within the housing 12. Preferably the body is built so that the forward part thereof extends beyond the housing 12 and the power plant covered thereby, though any other desirable arrangement may be provided. Any suitable sliding or swinging closure 13 may close the opening in the body leading to the transverse passageway therein.

Figure 2:
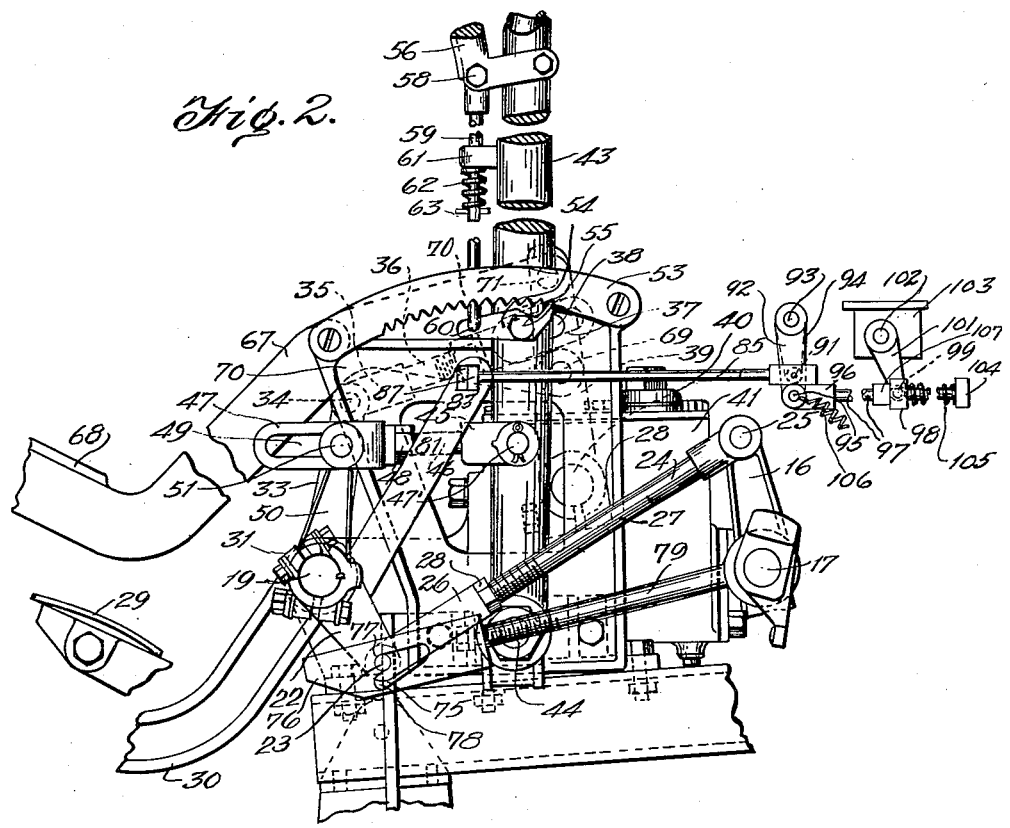
Figure 2 is a fragmentary side elevational view of the parts appearing in Figure 1.
Figure 3:
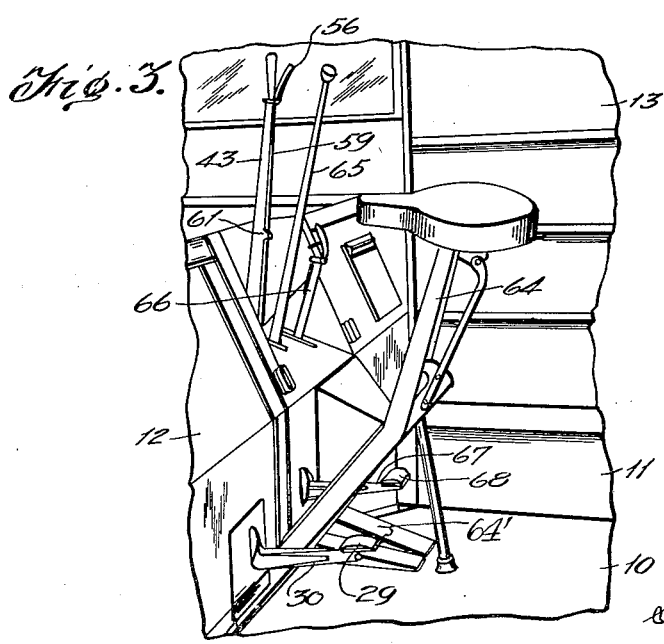
Figure 3 is a perspective view of the passageway through a delivery vehicle, showing the relation of the folding seat to the control elements disposed in said passageway.

Inasmuch as the vehicle is to be controlled at times by an operator who occupies the passageway in a standing position, a novel control mechanism illustrated in Figures 1 and 2 enabling this to be conveniently done, is included in the vehicle, such mechanism being disposed in large part so as to be housed in housing 12 as will be readily understood by those skilled in the art.

Referring to said figures, 16 designates an arm fixedly secured to a shaft 17 connected to clutch control mechanism of conventional form housed within a housing 18. The clutch preferably of the automatic centrifugally operated type disclosed in copending application Serial Number 488,757 filed October 15, 1930 forms a part of the driving mechanism for the vehicle in well known manner. As will be more fully understood by reference to said copending application, when the engine is operating at or below idling speeds or is at rest in automatic position, the centrifugal clutch operating weights are retracted and cause disengagement of the driving and driven members. When the engine speed increases above idling speed the driving and driven clutch members are brought into engagement with increasing pressures until at operating speeds of the engine at which sufficient torque is developed, the vehicle drive shaft with the transmission in high gear, is driven without slippage at engine speeds.

As will be clearly understood by reference to said copending application the driving and driven clutch members may be manually separated independently of the centrifugal weight operation through actuation of a clutch throwout bearing of usual construction to retract the driven clutch plate from engagement with the driving clutch plate, thereby disconnecting the drive shaft from the engine.

A shaft 19 is rotatably journalled in suitable bearings 20 and 21 suitably supported on the frame of the vehicle or other stationary part thereof. Rigidly attached to the shaft 19 is an arm 22, the end of which remote from the shaft 19 carries a transversely extending pin 23, connecting said arm to one end of a link 24, the opposite end of which is connected to the free end of arm 16 at 25. Preferably, the link 24 includes a part in the form of a hollow member 26, in which another externally threaded part 27 is fitted, permitting the length of the arm to be varied by adjusting the part 27 within the part 26, a locknut 28 holding the parts in adjusted position. It will be observed, referring to Figure 2, that the link 24 and the arm 22 are disposed at an oblique angle to each other when the clutch is in engaged position, the position in which the part is illustrated in said figure. In releasing the clutch the shaft 19 is operated in a counterclockwise direction, as hereinafter described, causing the arm 22 and link to approach a position in which they extend in a straight line. By virtue of this arrangement, the initial movement of the arm 22 causes first a rapid movement of the clutch arm 16. As the arm 22 and link 24 approach a position in which they extend in a straight line, the movement of the clutch control arm virtually ceases and further movement of the arm 22, bringing said arm and the link 24 into a straight line relation, or slightly beyond a straight line, has virtually no effect upon the clutch arm 16. The arrangement just described accordingly causes, when the shaft 19 is operated, first, a substantial movement of the arm 16, followed by virtually no further movement of said arm as the arm 22 and link 24 assume approximately a straight line position in relation to each other. Shaft 19 is operated by a foot pedal 29 rigidly secured to foot lever 30, non-rotatably secured at 31 to shaft 19 adjacent bearing 20.

Journalled for rotation on shaft 19 adjacent bearing 21 is a sleeve 32 on which arm 33 is integrally formed. Arm 33 adjacent its end remote from the shaft 19 is connected by pin 34 to the bifurcated portion 35 of a link 36. The end of the link opposite to that which is connected to the arm 33 is bifurcated at 37 and secured by means of pin 38 to arm 39. Arm 39 is connected to and rotates with shaft 40. Shaft 40 is connected to and operates the control elements of the master cylinder 41 of the hydraulic braking system of the vehicle.

In stopping the vehicle to make deliveries the braking mechanism is controlled by means of a hand lever 43, pivotally attached at 44 to the frame of the vehicle. The bifurcated head 45 of a link member 46 is pivotally connected to the lever 43 by means of a suitable pin 47'. Link member 46 is threaded so that link member 47 can be adjusted. The parts are held in adjustment by a locknut 48. The link member 47 is of bifurcated form and the furcations are slotted as shown at 49. An arm 50 integrally secured to sleeve 32 and rotatable on shaft 19 is operatively connected at the end remote from said shaft, to the link member 47 by means of a pin 51 extending transversely through the head 52, the pin being slidably disposed in the slots 49 of the link member 47. It will be observed that the slots 49 permit a substantial free movement of the arm 50 carried by sleeve 32 in counterclockwise direction, whereby the expected rotation of said sleeve by means of the brake foot pedal hereinafter described is permitted without interference, by virtue of the fact that the arm 50 carried by the sleeve 32 is connected to the hand lever 43. Nevertheless, when the hand lever 43 is swung counterclockwise about its pivot 44, said lever is effective to rotate the sleeve 32 in a counterclockwise direction, thus rotating sleeve 32, arm 33, and arm 39 operating the braking mechanism connected thereto.

In order that the lever 43 may be held in adjusted position a rack 53 in the form of a sector is disposed adjacent thereto. Cooperating with said rack is a dog 54 having teeth or a tooth arranged to mesh with the teeth of the rack 53. The dog 54 is pivoted to the lever 43 by means of a suitable pin or bolt 55 and its movement is controlled from the upper end of the lever by the means to be described. Pivotally connected to the arm 56 at 58 is a link 59 that is pivotally attached to the dog 54 it 60. The link 59 is guided through a perforated ear 61 projecting laterally from the lever 43. A coil spring 62 surrounding said link and abutting at one end against the projecting ear 61 and at its other end against a pin 63, passing through link 59, serves to maintain the tooth or teeth of the dog 54 in engagement with the rack 53.

It will be observed that the foot pedal 29 and the hand lever 43 are conveniently located for operation by an operator of the vehicle standing on the floor 10. A convenient folding seat structure 64 of a construction disclosed in detail in copending application Serial Number 558,616 is disposed conveniently adjacent the control mechanism, and the vehicle is provided in said passageway with a gear shift lever 65 of conventional form and an emergency brake control lever 66 likewise of any approved form.

In driving the vehicle in traffic it is desirable to apply the brake mechanism without operating hand lever 43. To do this, a lever 67 provided at one end with a foot pedal 68 that protrudes from the housing 12 above the fuel control mechanism 64', is utilized. Lever 67 is pivoted to the frame of the vehicle at 69 in any approved manner, at one corner of the triangular head 70 thereof (Figure 2). The upper corner of said triangular head is connected to the brake mechanism control lever 39 by means of a pin 71 that passes through the lever 39 and is connected thereto by a lost motion connection provided by the slot 71' in the end of the lever 39, permitting swinging of the pin in an arcuate path about the pivot 69. When the operator of the vehicle desires to retard its movement without releasing the clutch, he places his foot on the pedal 68, swinging the lever 67 about the pivot 69. Such swinging movement turns the operating arm 39 to apply the brakes to the vehicle. A suitable coil spring 72 connected at one end to a suitable securing member 73, attached in any way to the frame of the vehicle, and connected at its opposite end to the lever 39 serves to maintain said lever in a position in which the brake mechanism is released.

Clutch operating arm 22 and brake operating arm 50 are provided with integral throttle operating extensions 81 and 82 provided with the throttle rod supporting and operating members 83 and 84. Members 83 and 84 are provided with bores in which the rear ends of throttle rods 85 and 86 are slidably supported. Rods 85 and 86 are provided at their rear ends with heads 87 and 88 adapted to cooperate with members 83 and 84 in a manner that will more fully hereinafter appear. The forward ends of rods 85 and 86 are pivotally secured by means of pins 91 to the lower ends of the arms 92, the upper ends of which are rigidly secured to and supported by throttle control cross shaft 93. Throttle control shaft 93 is journalled in suitable bearings mounted in the vehicle frame, not shown, and secured thereto and rotatable therewith is the upper end of throttle operating arm 94, the lower end of which is pivotally connected by means of pin 95 to the bifurcated end 96 of throttle operating rod 97. Throttle operating rod 97 is slidably supported in a suitable bore formed in throttle operating member 98, pivotally secured by means of pin 99 to the lower end of throttle operating member 101. The upper end of arm 101 is secured to and operates throttle control shaft 102 of carburetor 103. Control rod 97 is provided with headed end 104 and interposed between end 104 and throttle operating member 98 is compression spring 105 surrounding shaft 97 which yieldingly transmits the motion of rod 97 to throttle operating arm 101.

Throttle arm 101 is urged toward wide open throttle position through the action of a tension spring 106, one end of which may be connected to pin 95 and the other end of which is connected to the vehicle frame, or by any other suitable spring connection arranged to force collar 107 of rod 97 against the rear face of throttle arm operating member 98.

To permit conversion from automatic clutch operation to positive clutch operation for purposes of starting the engine by coasting or towing the vehicle, pin 23 of arm 22 is extended into slot 75 of automatic and positive control latch 76 and is adapted to nest either in automatic notch 77 or positive notch 78. Latch 76 is adjustably threaded on the end of rod 79, the end of which is rotatably supported on clutch throwout shaft 17. Latch 76 is normally urged by gravity to the position shown in which pin 23 will mesh in automatic notch 77, but may be raised manually by the operator to permit pin 23 to enter notch 78. With pin 23 in notch 77, the clutch throwout bearing will be held in such position that when the engine is at rest or operating at or below idling speed, the automatic clutch mechanism will be retracted and the clutch plates will be disengaged, and as the engine speed rises above idling speeds the automatic centrifugal clutch mechanism will become effective to cause engagement of the clutch members and driving of the vehicle in the manner above set forth. With latch 76 raised and pin 23 in notch 78 the clutch throwout bearing will be in position to permit the clutch springs to force the clutch disks into driving engagement when the engine is at rest, so that a positive drive will be established between the engine and the vehicle drive shaft permitting starting of the engine by towing or coasting.

In the position of parts shown in the drawings with hand lever 43 in full forward position and clutch and brake pedals 29 and 68 released, throttle operating members 83 and 84 carried by clutch lever arm 22 and brake lever arm 50 will be in forward position and spring 106 will be contracted holding the throttle of carburetor 103 in wide open position. The brake mechanism is so adjusted that until lever 43 has been retracted sufficiently to cause link 46 to rotate arm 50 a sufficient amount to retract rod 86, arm 92, shaft 93, and rod 97 against the action of spring 106 sufficiently to move throttle arm 101 and the connected throttle to closed position, no brake application will occur. After the throttle is closed continued movement of lever 43 in a countercloskwise direction in Figure 2 will cause application of the brakes through rotation of sleeve 32, arm 33, link 36, brake arm 39 and shaft 40. Accordingly to control the speed of the vehicle the operator of the vehicle sets lever 43 in the desired position between the closed throttle position and open throttle position, thereby setting member 82 in a position to give the desired maximum throttle opening, in which position the throttle will be held so long as the clutch and brake pedals 29 and 68 are released.

To retard the vehicle speed brake pedal 68 may be depressed by the operator. The first movement of pedal 68 retracts throttle operating member 84 through rotation of arms 33 and 50 and sleeve 32 by the operation of link 36, closing the throttle as above set forth. Further depression of pedal 68 after the throttle is closed will result in application of the brakes. Because of the connection of arm 50 to link 46 through pin 51 and slot 49 free movement of pedal 68 for throttle and brake control operations is permitted without movement of lever 43 from throttle control position.

When clutch pedal 29 is depressed, arm 22 is advanced and extension 81 and throttle operating member 83 will be retracted to cause control rod 85 to operate arm 101 toward closed throttle position through shaft 93 and rod 97. After the throttle reaches closed position, further movement of pedal 29 causes manual disengagement of the vehicle clutch in well known manner.

It will therefore be seen that when either the clutch or the brake pedal is depressed, the engine throttle will be closed and cannot again be opened until both the clutch and brake pedals are released, and control lever 43 is moved forward from closed throttle position towards open throttle position.

With the hand lever 43 in closed throttle position and pedals 29 and 68 in released position shown in Figure 2, or with either pedal 29 or 68 depressed, the throttle will be closed, the engine speed will drop to idling, and the automatic clutch mechanism will disengage the clutch driving member from the clutch driven member until the engine speed is again accelerated by opening of the throttle to speed the engine above idling speed.

In traffic, the operator can therefore set hand lever 43 to give the desired maximum vehicle speed and when he desires to slow the vehicle speed or stop for traffic, all that will be required is depression of the brake pedal 68 to close the throttle and apply the brakes. If the vehicle slows down to a speed corresponding to the idling speed of the engine the clutch will automatically release, and the vehicle may be brought to a full stop by brake application or speed may be immediately picked up by release of the brake pedal with resultant immediate opening of the throttle. With the vehicle stopped and the engine operating at idling speed, upon release of the brake pedal the throttle will immediately be opened the desired amount, and as the engine speeds up the clutch disclosed in said pending application will pick up the vehicle in high gear under normal operating conditions without the necessity of gear shifting operations. Where a quick pick-up is desired or the vehicle is stopped on a hill too steep to permit pick-up of the vehicle in high gear, as soon as the automatic clutch release occurs the operator can shift into a lower gear and when the brake is released the vehicle will pick-up very rapidly.

After such an operation to again get into high gear or direct drive the operator may depress clutch pedal 29 in the usual manner to manually disengage the clutch and shift in the usual manner. As soon as the clutch is released the throttle, which closed on actuation of the clutch pedal, will again open to the predetermined position.

When the driver desires to stop for the purpose of making a delivery, all that he need do is move lever 43 from open throttle position to the full brake application position. As lever 43 approaches neutral position (i. e. the end of its movement in a counterclockwise direction) the throttle will be fully closed, and thereafter the brake will be applied. As the engine drops to idling speed the automatic clutch will effect disconnection of the engine from the driven shaft and the vehicle comes to rest with the engine operated at idling speeds. The driver can immediately leave the vehicle to make a delivery and when he returns all that he need do to start the vehicle is to adjust hand lever 43 forward of the neutral position a sufficient amount to set the throttle for the desired speed of the vehicle. As the throttle opens the engine will speed up and the automatic clutch will engage in the manner above set forth.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. Vehicle drive and control mechanism comprising a clutch forming a part of the vehicle drive mechanism; a control shaft having a unitary means to rotate it; an arm for controlling said clutch; a second arm fixed to said shaft; a throttle controlling connection operated by said second arm; a link connecting said arms; brake mechanism for the vehicle; a second throttle controlling connection; and a common operating mechanism for said second throttle controlling connection and said brake mechanism.

2. Vehicle drive and control mechanism comprising a self-operating clutch forming a part of the vehicle drive mechanism; a control shaft having a unitary means to rotate it; an arm for controlling said clutch; a second arm fixed to said shaft; a throttle controlling connection operated by said second arm; a link connecting said arms; brake mechanism for the vehicle; a second throttle controlling connection and mechanism operatively connecting said second throttle controlling connection and said brake mechanism, said mechanism including a lost-motion connection arranged to permit throttle control operations without applying said brake mechanism.

3. Vehicle drive and control mechanism comprising an internal combustion engine provided with a controlling throttle and a self-operating clutch driven by said engine; vehicle brake mechanism; a hand lever controlling said brake mechanism; a foot pedal controlling said brake mechanism; and connections between said throttle, said foot pedal, and said hand lever, operative to control the maximum opening of said throttle by the setting of said hand lever and to cause closing of said throttle regardless of the position of said hand lever when said foot pedal is depressed.

4. Vehicle drive and control mechanism comprising an internal combustion engine provided with a controlling throttle and an automatically operable clutch driven by said engine; a manually operable foot pedal controlling said clutch; a brake controlling hand lever; vehicle brake mechanism operated by said hand lever through a lost-motion connection; means controlled by said hand lever controlling the opening of said throttle; and means to cause closing of said throttle regardless of the position of said hand lever when said foot pedal is depressed.

5. The combination as set forth in claim 4 together with means for preventing automatic operation of said clutch at the will of the vehicle operator.

6. Vehicle drive and control mechanism comprising an internal combustion engine provided with a controlling throttle for said engine and an automatically operable clutch driven by said engine; vehicle brake mechanism; a controlling foot pedal for said brake mechanism; a hand lever controlling said brake mechanism; means controlled by said hand lever operative to control the opening of said throttle; and means to cause closing of said throttle and application of said brake mechanism regardless of the position of said hand lever when said foot pedal is depressed.

7. Vehicle drive and control mechanism comprising an internal combustion engine provided with a controlling throttle for said engine and an automatically operable clutch driven by said engine; a manually operable foot pedal controlling said clutch; vehicle brake mechanism; a controlling foot pedal for said brake mechanism; a hand lever controlling said brake mechanism; means controlled by said hand lever operative to control the opening of said throttle; and means to cause closing of said throttle regardless of the position of said hand lever when either of said foot pedals is actuated.

8. The combination as set forth in claim 7 together with a latch mechanism for said clutch pedal operative to permit or prevent automatic operation of said clutch.

9. A drive and control mechanism comprising an engine; a controlling throttle for said engine; a clutch driven by said engine; drive mechanism driven by said clutch; a manually operable means controlling said clutch; brake mechanism for said drive mechanism; a hand lever controlling said brake mechanism; and connections between said throttle, said clutch control means and said hand lever, operative to control the maximum opening of said throttle by the setting of said hand lever and to cause closing of said throttle regardless of the position of said hand lever whenever said clutch control means is actuated to release said clutch.

10. In combination, an internal combustion engine, a controlling throttle for said engine; a clutch driven by said engine; a manually operable control means for said clutch; mechanism driven by said clutch; braking means for said mechanism; a hand lever; interconnections between said throttle, said lever and said braking means operative in one range of movement of said lever to control said throttle between open and closed position, and in another range of movement of said lever to control said brake mechanism between released and applied condition; and a control connection between said clutch control means and said throttle operative to close said throttle when said clutch is operated to disconnect said engine from said mechanism.

11. A drive and control mechanism comprising an engine; a controlling throttle for said engine; an automatically operable clutch driven by said engine; means driven by said clutch; manually operable control means for said clutch; brake mechanism for said driven means; a hand lever controlling said brake mechanism; means operative to control the opening of said throttle by the setting of said hand lever; and means to cause closing of said throttle regardless of the position of said hand lever whenever said clutch control means is actuated to release said clutch.

12. Vehicle drive and control mechanism comprising an internal combustion engine; a controlling throttle for said engine; a clutch driven by said engine; vehicle drive means driven by said clutch; vehicle brake mechanism; a hand lever controlling said brake mechanism; a foot pedal and connections between said throttle, said foot pedal, and said hand lever, operative to control the maximum opening of said throttle by the setting of said hand lever and to cause closing of said throttle regardless of the position of said hand lever when said foot pedal is depressed.

13. Vehicle drive and control mechanism comprising an internal combustion engine; a controlling throttle for said engine; an automatically operable clutch driven by said engine; vehicle drive means driven by said clutch; a manually operable foot pedal controlling said clutch; a brake controlling hand lever; means controlled by said hand lever controlling the opening of said throttle; and means to cause closing of said throttle regardless of the position of said hand lever when said foot pedal is depressed.

14. Vehicle drive and control mechanism comprising an internal combustion engine; a controlling throttle for said engine; an automatically operable clutch driven by said engine; vehicle drive means driven by said clutch; a brake controlling foot pedal; a brake controlling hand lever; means controlled by said hand lever operative to control the opening of said throttle; and means to cause closing of said throttle regardless of the position of said hand lever when said foot pedal is depressed.

15. Vehicle drive and control mechanism comprising an internal combustion engine; a controlling throttle for said engine; an automatically operable clutch driven by said engine; vehicle drive means driven by said clutch; a manually operable foot pedal controlling said clutch; a brake controlling foot pedal; a brake controlling hand lever; means controlled by said hand lever operative to control the opening of said throttle; and means to cause closing of said throttle regardless of the position of said hand lever when either of said foot pedals is actuated.

16. In a delivery vehicle of the kind that includes a passageway extending across the body; vehicle control element accessible from said passageway comprising a clutch controlling foot pedal, and a brake controlling hand lever; and fuel controlling connections actuated by said foot pedal and said hand lever.

17. In a delivery vehicle of the kind that includes a passageway extending across the body; vehicle control elements accessible from said pasageway comprising a clutch controlling foot pedal, a brake controlling foot pedal, and a brake controlling hand lever; and fuel controlling connections actuated by each of said foot pedals and said hand lever.

18. In a vehicle of the kind adapted for operation by an operator making deliveries, vehicle drive and control mechanism comprising an internal combustion engine provided with a controlling throttle and a self-operating clutch driven by said engine, vehicle brake mechanism, a hand lever to control said brake mechanism, and connections between said throttle, said brake mechanism and said hand lever operative to stop, accelerate, and control the speed of said vehicle whereby the operator may readily exercise complete control of said vehicle.

19. A vehicle comprising vehicle drive and control mechanism including an internal combustion engine provided with a controlling throttle and a self operating clutch driven by said engine, vehicle brake mechanism, a foot lever to control said brake mechanism, a hand lever, and connections between said throttle, said foot lever and said brake mechanism operative to start and stop said vehicle, and a connection between said hand lever and said foot lever operative to control the speed of said vehicle.

20. The combination as set forth in claim 19 in which said last named connection is operative to stop said vehicle.

WILLIAM B. FAGEOL.